United States Patent
Jung et al.

(10) Patent No.: US 9,640,792 B2
(45) Date of Patent: May 2, 2017

(54) BATTERY ASSEMBLY HAVING SINGLE ELECTRODE TERMINAL CONNECTION PART

(71) Applicant: LG CHEM, LTD., Seoul (KR)

(72) Inventors: Jun Hee Jung, Daejeon (KR); Sooryoung Kim, Daejeon (KR); Jong Woon Choi, Daejeon (KR); Jung Oh Moon, Daejeon (KR); Tae Hwan Roh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 210 days.

(21) Appl. No.: 14/542,779

(22) Filed: Nov. 17, 2014

(65) Prior Publication Data

US 2015/0072205 A1 Mar. 12, 2015

Related U.S. Application Data

(63) Continuation of application No. PCT/KR2013/005122, filed on Jun. 11, 2013.

(30) Foreign Application Priority Data

Jun. 13, 2012 (KR) .................. 10-2012-0062934

(51) Int. Cl.
| | |
|---|---|
| *H01M 2/30* | (2006.01) |
| *H01M 2/10* | (2006.01) |
| *H01M 2/26* | (2006.01) |
| *H01M 10/04* | (2006.01) |
| *H01M 2/02* | (2006.01) |

(52) U.S. Cl.
CPC ......... *H01M 2/305* (2013.01); *H01M 2/0262* (2013.01); *H01M 2/0277* (2013.01);
(Continued)

(58) Field of Classification Search
CPC .. H01M 2/1077; H01M 2/266; H01M 2/0287; H01M 2/0285; H01M 2/0277;
(Continued)

(56) References Cited

U.S. PATENT DOCUMENTS

| | | |
|---|---|---|
| 6,569,561 B1 | 5/2003 | Kimura et al. |
| 2004/0009334 A1 | 1/2004 | Miyamoto et al. |

(Continued)

FOREIGN PATENT DOCUMENTS

| | | |
|---|---|---|
| CN | 101496194 A | 7/2009 |
| CN | 102356504 A | 2/2012 |

(Continued)

OTHER PUBLICATIONS

International Search Report, issued in PCT/KR2013/005122, mailed Aug. 28, 2013.

*Primary Examiner* — Barbara Gilliam
*Assistant Examiner* — Angela Martin
(74) *Attorney, Agent, or Firm* — Birch, Stewart, Kolasch & Birch, LLP

(57) ABSTRACT

Disclosed herein is a battery assembly including at least two battery cells connected in series or in parallel. Each of the battery cells includes an electrode assembly including a cathode, an anode and a separator interposed between the cathode and the anode and a battery case in which the electrode assembly is mounted. An electrode terminal of a first battery cell and an electrode terminal of a second battery cell are formed as a single member at a series or parallel connection portion between the first and second battery cells.

13 Claims, 5 Drawing Sheets

(52) U.S. Cl.
CPC ....... *H01M 2/0285* (2013.01); *H01M 2/0287* (2013.01); *H01M 2/1077* (2013.01); *H01M 2/266* (2013.01); *H01M 10/0413* (2013.01); *H01M 10/0431* (2013.01); *H01M 2220/10* (2013.01); *H01M 2220/20* (2013.01)

(58) Field of Classification Search
CPC ............... H01M 2/0262; H01M 2/305; H01M 10/0413; H01M 10/0431; H01M 2220/10; H01M 2220/20
See application file for complete search history.

(56) References Cited

U.S. PATENT DOCUMENTS

| | | |
|---|---|---|
| 2008/0131765 A1 | 6/2008 | Imanaga et al. |
| 2009/0325043 A1 | 12/2009 | Yoon et al. |
| 2010/0015511 A1 | 1/2010 | Yoo et al. |
| 2010/0021802 A1 | 1/2010 | Yang et al. |
| 2011/0070474 A1 | 3/2011 | Lee et al. |
| 2012/0052364 A1* | 3/2012 | Khakhalev ............ H01M 2/204 429/156 |
| 2012/0189890 A1* | 7/2012 | Mitsuda ................. H01G 11/10 429/94 |

FOREIGN PATENT DOCUMENTS

| | | |
|---|---|---|
| JP | 2004-247244 A | 9/2004 |
| JP | 2006-79909 A | 3/2006 |
| JP | 2008-123768 A | 5/2008 |
| JP | 2009-537944 A | 10/2009 |
| JP | 2010-3803 A | 1/2010 |
| JP | 2012-38495 A | 2/2012 |
| KR | 10-2010-0000884 A | 1/2010 |
| KR | 10-2010-0109871 A | 10/2010 |
| KR | 20100109871 A * | 10/2010 ............. B60L 11/18 |

\* cited by examiner

300

BATTERY ASSEMBLY HAVING SINGLE ELECTRODE TERMINAL CONNECTION PART

CROSS REFERENCE TO RELATED APPLICATIONS

This application is a Continuation of PCT International Application No. PCT/KR2013/005122 filed on Jun. 11, 2013, which claims priority under 35 U.S.C. §119(a) to Patent Application No. 10-2012-0062934 filed in Republic of Korea on Jun. 13, 2012, all of which are hereby expressly incorporated by reference into the present application.

TECHNICAL FIELD

The present invention relates to a battery assembly having a single electrode terminal connection part and, more particularly, to a battery assembly which includes at least two battery cells connected in series or in parallel, each of the battery cells including an electrode assembly including a cathode, an anode and a separator interposed between the cathode and the anode and a battery case in which the electrode assembly is mounted, wherein an electrode terminal of a first battery cell and an electrode terminal of a second battery cell are formed as a single member at a series or parallel connection portion between the first and second battery cells.

BACKGROUND ART

Secondary batteries, which can be charged and discharged, have attracted considerable attention as power sources for devices that require high power and large capacity such as electric vehicles (EV), hybrid electric vehicles (HEV) and plug-in hybrid electric vehicles (Plug-in HEV), which have been developed to solve problems, such as air pollution, caused by existing gasoline and diesel vehicles that use fossil fuels.

Such devices use a middle or large-sized battery module having a number of battery cells electrically connected to provide high power and large capacity.

Since the middle or large-sized battery module is preferably manufactured to have as small a size and weight as possible, prismatic batteries or pouch-shaped batteries, which can be stacked with high integration and have a small weight to capacity ratio, are usually used as battery cells (i.e., unit cells) of middle or large-sized battery modules. In particular, much interest is currently focused on pouch-shaped batteries, which use an aluminum laminate sheet as a sheathing member, due to advantages such as light weight, low manufacturing cost, and easy shape change.

Recently, a pouch-shaped battery structured such that a stacked or stacked/folded electrode assembly is mounted in a pouch-shaped battery case formed of an aluminum laminate sheet has also attracted considerable attention and use thereof has gradually increased due to advantages such as low manufacturing cost, light weight, and easy shape change.

Electrode tabs of such a pouch-shaped secondary battery are generally formed of a foil having a thickness of 0.5 mm or less. Plural electrode tabs (i.e., cathode or anode tabs) are coupled to an electrode lead (i.e., a cathode or anode lead) through ultrasonic welding to form an electrode terminal. In a state in which such electrode terminals are arranged in a longitudinal direction such that the electrode terminals are successively adjacent to each other, the electrode terminals are coupled to each other through welding. Then, the arrangement of battery cells is folded into pairs of overlapping battery cells to manufacture pouch-shaped secondary batteries.

Electrode terminals of the battery cells are connected to each other or electrode terminals and bus bars of the battery cells are connected to each other through laser welding or ultrasonic welding.

However, in the above structure, bus bars are fixed to a battery module through repetitive welding processes. Therefore, when impact or vibration is applied to the battery module, causing relative movement of the battery cells and the battery module, external force is focused on electrode terminals through which bus bars and battery cells are connected to each other or electrode terminals through which battery cells are connected to each other, thereby causing structural weakness.

The battery module also suffers from such a problem when the battery module is mounted to a vehicle or the like such that the battery module is repetitively exposed to external impact and vibration.

In addition, cathode terminals are much more vulnerable to external impact and vibration than anode terminals due to inherent weakness of the material of cathode terminals formed of aluminum as compared to anode terminals formed of copper.

Thus, there is a great need to provide a secondary battery that fundamentally prevents internal short circuit and breakage due to external impact while providing large capacity and high power and maintaining structural reliability.

DISCLOSURE

Technical Problem

Therefore, the present invention has been made to solve the above and other technical problems that have yet to be resolved.

As a result of a variety of extensive and intensive studies and experiments, the present inventors have developed a battery assembly having a novel electrode terminal connection part, wherein electrode terminals of adjacent battery cells are formed as a single member at a series or parallel connection portion between the battery cells, thereby greatly reducing the number of welding processes between electrode terminals while maintaining coupling force between electrode terminals even when external force such as impact or vibration is applied.

Technical Solution

In accordance with the present invention, the above and other objects can be accomplished by the provision of a battery assembly including at least two battery cells connected in series or in parallel, each of the battery cells including an electrode assembly including a cathode, an anode and a separator interposed between the cathode and the anode and a battery case in which the electrode assembly is mounted, wherein an electrode terminal of a first one of the battery cells and an electrode terminal of a second one of the battery cells are formed as a single member at a series or parallel connection portion between the first and second battery cells.

According to the present invention, since the battery assembly is configured such that an electrode terminal of the first battery cell and an electrode terminal of the second battery cell are formed as a single member at a series or parallel connection portion between the first and second battery cells, it is possible to greatly reduce the number of welding processes while securing coupling force between electrode terminals even when external force such as impact or vibration is applied.

The battery cell is preferably a plate-shaped battery cell, which has a small thickness and a relatively large width and length so as to minimize the overall size of the battery module when the plate-shaped battery cells are stacked to form the battery module.

A preferred example of the plate-shaped battery cell is a battery cell structured such that a case formed of a laminate sheet including a metal layer and a resin layer is sealed around the perimeter of the case through thermal welding after an electrode assembly is mounted in the case. Specifically, the plate-shaped battery cell may be structured such that an electrode assembly is mounted in a pouch-shaped case formed of an aluminum laminate sheet. This type of secondary battery may also be referred to as a pouch-shaped battery cell.

The electrode assembly may have, but is not limited to, a wound structure, a stacked structure, or a stacked/folded structure. Preferably, the electrode assembly has a stacked structure or a stacked/folded structure. The stacked/folded structure is a structure in which a plurality of bicells, each having the same electrodes at opposite sides thereof, or a plurality of full cells, each having different electrodes at opposite sides thereof, is wound using a separation film.

Preferably, the electrode terminals of each of the battery cells may include a cathode terminal formed of aluminum and an anode terminal formed of nickel-plated copper. Each of the battery cells may be structured such that a cathode terminal and an anode terminal protrude respectively from upper and lower ends of the battery cell such that the cathode and anode terminals face opposite ends of the battery case, respectively.

In a preferred example, each of the battery cells is structured such that electrode tabs extending respectively from electrode plates of the electrode assembly are coupled to a single electrode lead and the first battery cell and the second battery cell are structured such that electrode tabs of the first battery cell and electrode tabs of the second battery cell are coupled to a single electrode lead at a series or parallel connection portion between the first and second battery cells.

This structure significantly reduces the number of welding processes since the electrode tabs of the first and second battery cells are connected through a single electrode lead.

The present invention also provides a battery module including one or more battery assemblies configured as described above.

In a preferred example, each of the battery assemblies of the battery module includes two battery cells. Preferably, the battery cells of each of the battery assemblies are arranged in a stacked configuration and electrode terminals of the battery cells are bent at a series or parallel connection portion between the battery cells to achieve the stacked configuration.

Specifically, battery cells of a battery assembly or battery cells of battery assemblies are connected in series or in parallel. In a preferred example, a plurality of battery assemblies may be manufactured by coupling electrode terminals of battery cells to each other in a state in which the battery cells are arranged in series or in parallel in a longitudinal direction such that the electrode terminals of the battery cells are successively adjacent to each other, folding the arrangement of battery cells into groups of two or more overlapping battery cells, and covering each group of battery cells with a cell cover.

Preferably, outer surfaces of the battery cells stacked in each of the battery assemblies are covered with a pair of cell covers that are coupled to each other. The cell cover protects battery cells having a low mechanical strength while inhibiting repetitive changes of the battery cells such as expansion and contraction during charge/discharge, thereby preventing separation of sealing portions of the battery cells.

In a preferred example, electrical connection between the battery assemblies is achieved by direct coupling between an electrode terminal of a battery cell of a first one of the battery assemblies and an electrode terminal of a battery cell of a second one of the battery assemblies.

The present invention also provides a device that uses the above battery module as a power source. Preferred examples of the device include, but are not limited to, an electric vehicle, a hybrid electric vehicle, a plug-in hybrid electric vehicle, or a power storage device.

A detailed description of the structure and manufacturing method of the device is omitted herein since they are well known in the related art.

Advantages

Since the battery assembly according to the present invention is configured such that an electrode terminal of the first battery cell and an electrode terminal of the second battery cell are formed as a single member at a series or parallel connection portion between the first and second battery cells as described above, it is possible to greatly reduce the number of welding processes between the electrode terminals while stably maintaining coupling force between electrode terminals even when external force such as impact or vibration is applied.

Thus, according to the secondary battery according to the present invention, it is possible to maintain coupling force between the electrode terminals even when external force generated upon assembly or use of a battery pack is transferred to the electrode terminals.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, embodiments of the present invention will be described in detail with reference to the accompanying drawings. However, it should be noted that the description of the embodiments is to provide better understanding of the present invention without limiting the scope of the invention.

Figure 1:
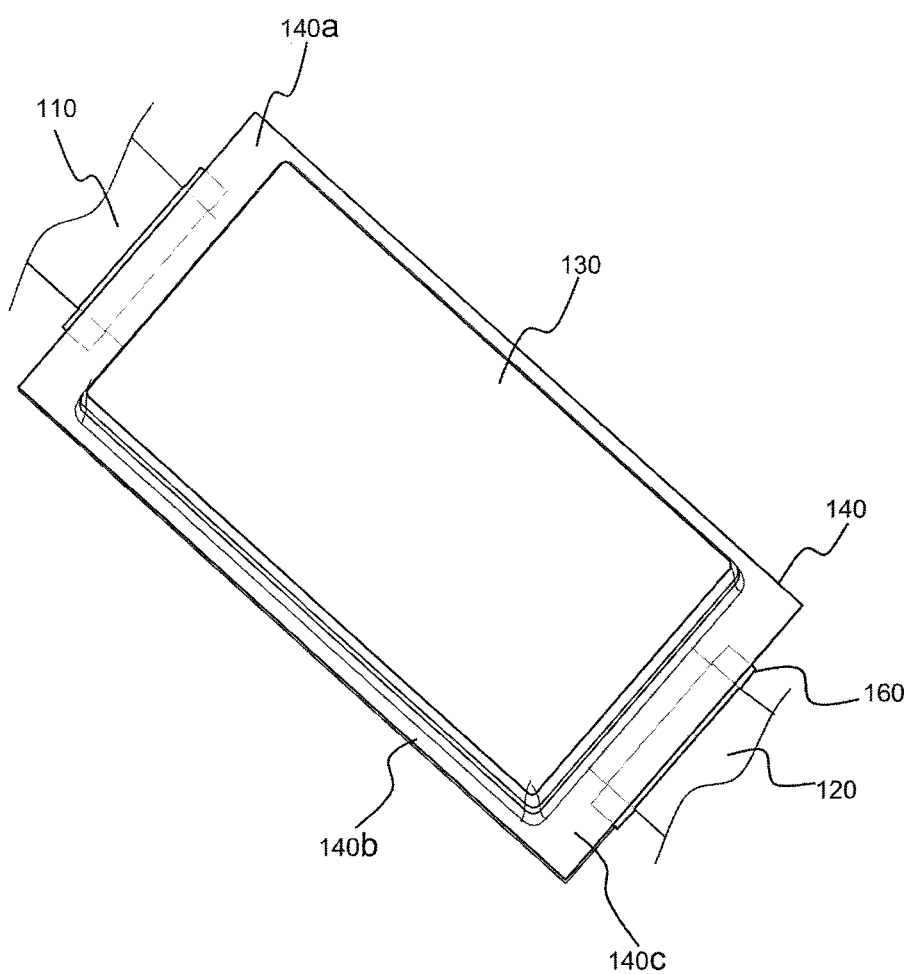
FIG. 1 is a perspective view of a pouch-shaped battery.

FIG. 1 is a schematic perspective view of a pouch-shaped battery. As shown in FIG. 1, a first battery cell 101 is structured such that a cathode terminal 110 and an anode terminal 120 protrude respectively from the upper and lower ends of a battery body 130 so that the cathode and anode terminals 110 and 120 are opposite to each other. A battery case 140 includes upper and lower sheathing parts. That is, the battery case 140 is a two-unit member. In a state in which an electrode assembly (not shown) is mounted within a receiving part defined between the upper and lower sheathing parts of the battery case 140, opposite sides 140b, upper ends 140a and lower ends 140c of the upper and lower sheathing parts of the battery case 140, which are contact regions of the upper and lower sheathing parts, are bonded to each other to form the first battery cell 101. The battery case 140 has a laminate structure of a resin layer, a metal foil layer, and a resin layer. Thus, it is possible to bond the opposite sides 140b and the upper and lower ends 140a and 140c of the upper and lower sheathing parts of the battery case 140, which are in contact with each other, to each other by applying heat and pressure to the opposite sides 140b and the upper and lower ends 140a and 140c to weld the resin layers thereof to each other. Where appropriate, the opposite sides 140b and the upper and lower ends 140a and 140c of the upper and lower sheathing parts of the battery case 140 may be bonded to each other using a bonding agent.

The same resin layers of the upper and lower sheathing parts of the battery case 140 are in direct contact with each other at the opposite sides 140b. Therefore, the upper and lower sheathing parts of the battery case 140 can be uniformly sealed by welding at the opposite sides 140b. On the other hand, the cathode and anode terminals 110 and 120 protrude by a specific length from the upper and lower ends 140a and 140c of the battery case 140, respectively. Therefore, the upper and lower ends 140a and 140c of the upper and lower sheathing parts of the battery case 140 are thermally welded to each other in a state in which a film type sealing member 160 is interposed between the cathode and anode terminals 110 and 120 and the battery case 140 to improve sealability of the battery case 140 in consideration of the thickness of the cathode and anode terminals 110 and 120 and the material difference between the cathode and anode terminals 110 and 120 and the battery case 140.

Figure 2:
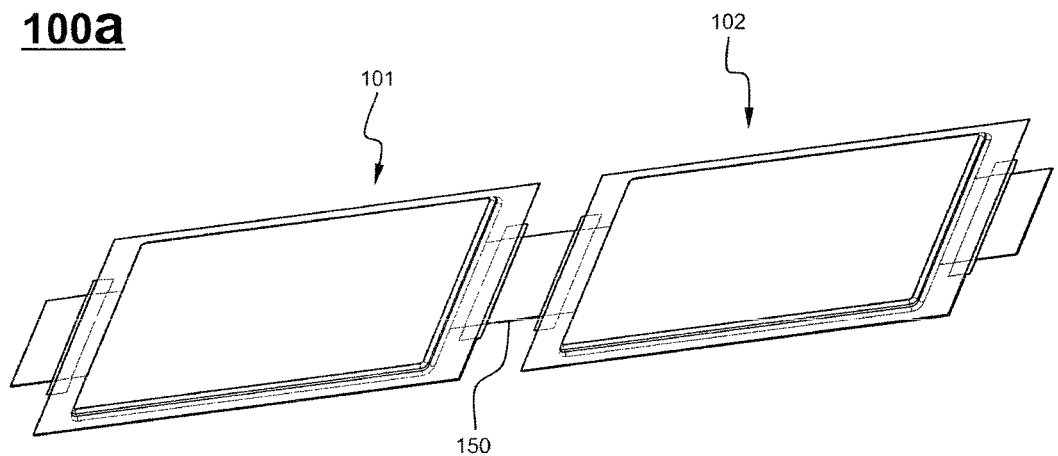
FIGS. 2 and 3 are perspective views of a battery assembly in which two pouch-shaped batteries of FIG. 1 are connected in series.
Figure 3:
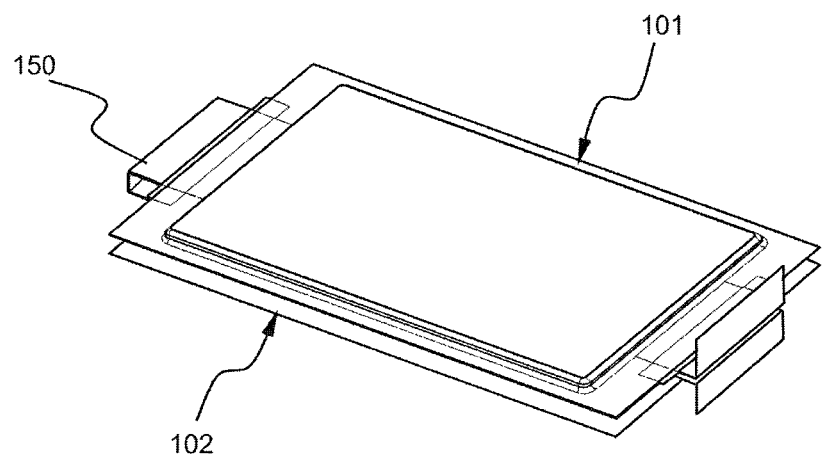

FIGS. 2 and 3 are schematic perspective views of a battery assembly in which two pouch-shaped battery cells of FIG. 1 are connected in series.

Referring to FIGS. 2 and 3 together with FIG. 1, a battery cell stack 100a includes two pouch-shaped battery cells, a first battery cell 101 and a second battery cell 102, that are connected in series and electrode terminals of the two battery cells 101 and 102 are formed as a single electrode lead connection part 150 at a series connection portion between the two battery cells 101 and 102. In the battery cell stack 100a of FIG. 3, the battery cells 101 and 102 overlap each other and the electrode lead connection part 150 is bent into a U-shape in cross section.

Figure 4:
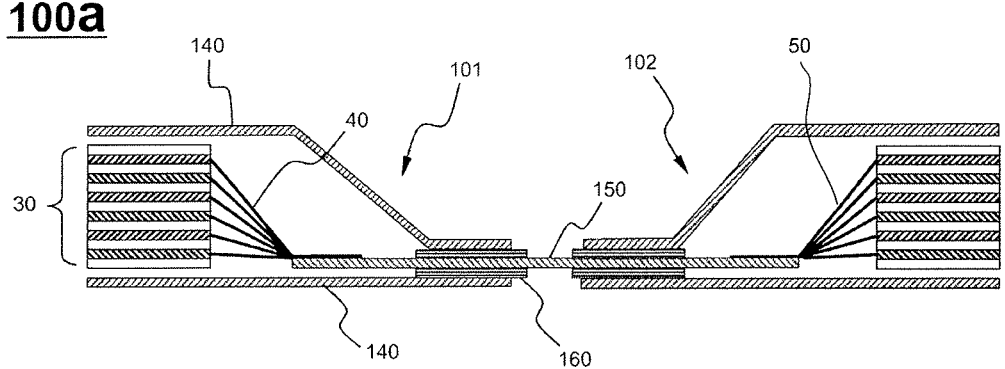
FIG. 4 is a partial vertical cross-sectional view of a battery assembly according to an embodiment of the present invention.

FIG. 4 is a partial vertical cross-sectional view schematically showing a battery assembly according to an embodiment of the present invention.

As shown in FIG. 4, the battery assembly includes a first battery cell 101 and a second battery cell 102. The first and second battery cells 101 and 102 include respective electrode assemblies 30, respective pluralities of electrode tabs 40 and 50 (i.e., cathode tabs 40 and anode tabs 50) extending from the electrode assemblies 30, an electrode lead connection part 150 that is a single member welded to the electrode tabs 40 and 50, and respective battery cases 140 in which the electrode assemblies 30 are received.

Each of the electrode assemblies 30 is a power generation element in which cathodes and anodes, each being coated with a corresponding electrode active material on both sides thereof, are successively stacked with separators being disposed between the cathodes and the anodes. The electrode assembly 30 has a stacked structure or a stacked/folded structure. The electrode tabs 40 and 50 extend respectively from electrode plates of each of the electrode assemblies 30. The electrode lead connection part 150 is electrically connected to the electrode tabs 40 and 50 extending from the electrode plates of the electrode assemblies 30, for example, by welding. The electrode lead connection part 150 is partially exposed from the battery cases 140. Insulative films 160 are attached to parts of the upper and lower surfaces of opposite end portions of the electrode lead connection part 150 to improve sealability between the battery cases 140 and the electrode lead connection part 150 while securing electrical insulation between the battery cases 140 and the electrode lead connection part 150.

Each of the battery cases 140 is formed of an aluminum laminate sheet, provides an electrode assembly receiving space to receive the electrode assembly 30, and has a substantially pouch shape. In the case of the stacked type electrode assembly 30 shown in FIG. 1, the inner upper surface of each of the battery cases 140 is separated from a corresponding one of the electrode assemblies 30 to allow all of the cathode and anode tabs 40 and 50 to be coupled to the electrode lead connection part 150.

Figure 5:
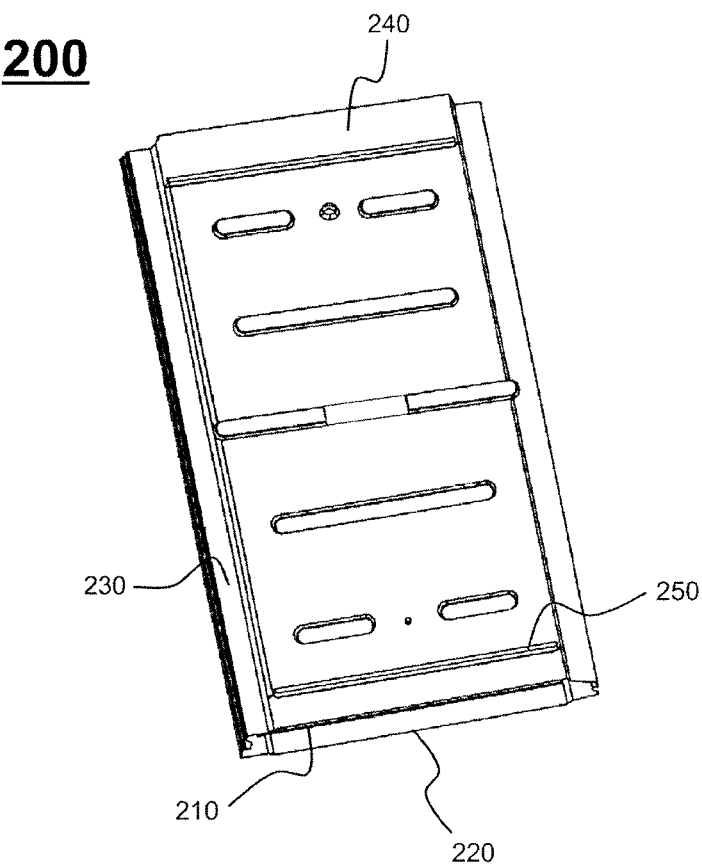
FIG. 5 is a perspective view of a cell cover in which battery cells of FIG. 1 will be mounted to form a unit module.

FIG. 5 is a perspective view of a cell cover in which two battery cells of FIG. 1 will be mounted to form a unit module.

As shown in FIG. 5, the cell cover 200 receives two pouch-shaped battery cells (not shown), each of which is shown in FIG. 1, and serves not only to supplement the mechanical strength of the battery cells but also to facilitate mounting of the battery cells to a module case (not shown). One electrode terminals of the two battery cells are connected to each other such that the two battery cells are connected in series. The two battery cells are then folded such that the two battery cells are tightly mounted within the cell cover 200.

The cell cover 200 includes a pair of members 210 and 220 which are coupled to each other and each of which is formed of a high strength sheet. The cell cover 200 has steps 230 on the outside thereof at positions near the left and right ends to facilitate fixing of the module. The cell cover 200 also has steps 240 on the outside thereof at positions near the upper and lower ends for the same purpose. In addition, the cell cover 200 has laterally extending fixing parts 250 at upper and lower portions thereof to facilitate mounting of the module to a module case (not shown).

Figure 6:
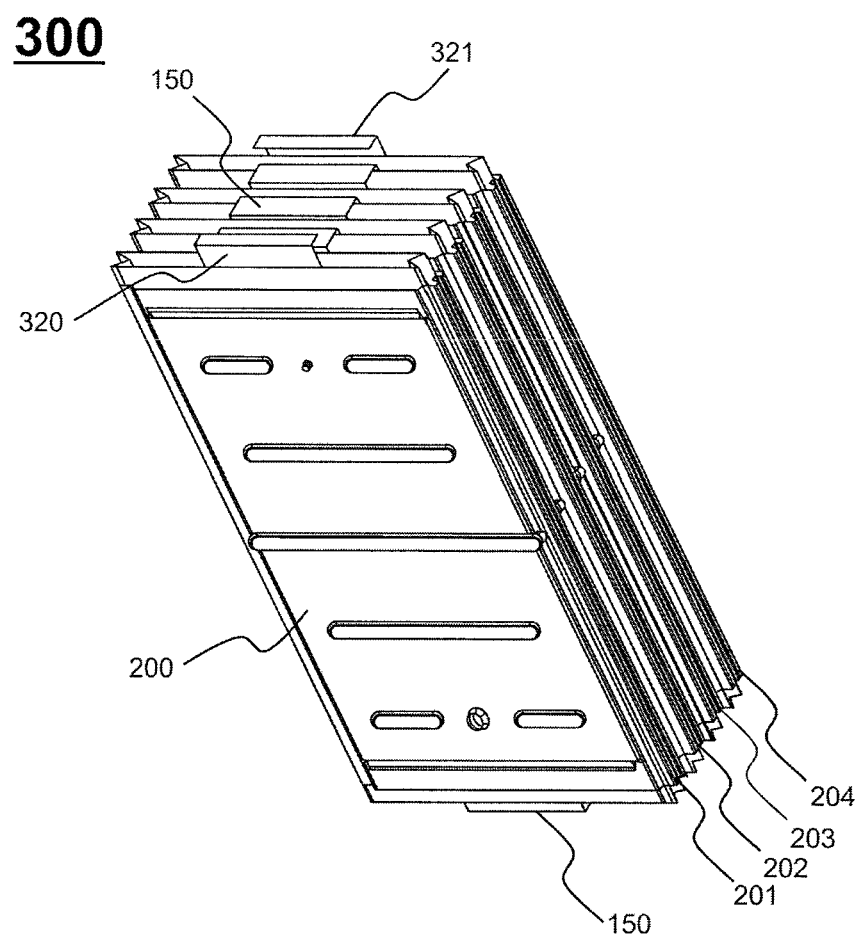
FIG. 6 is a perspective view of a unit module stack including a plurality of connected battery assemblies.
Figure 7:
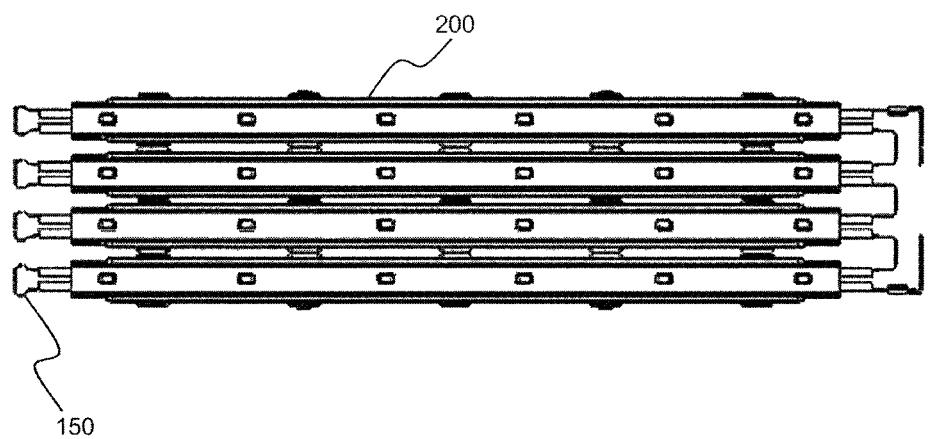
FIG. 7 is a plan view of the unit module stack of FIG. 6.

FIG. 6 is a perspective view of a unit module stack including a plurality of connected unit modules and FIG. 7 is a schematic plan view of the unit module stack.

As shown in FIGS. 6 and 7, the unit module stack 300 includes 4 unit modules 201, 202, 203, and 204. Each of the unit modules 200 includes 2 battery cells (not shown) and therefore the unit module stack 300 includes a total of 8 battery cells. Electrode terminals are coupled in series between the battery cells and between unit modules. Electrode lead connection parts 150, each of which is formed as a single member between battery cells in a corresponding battery module, are each bent into a U-shape in cross section in order to form the module assembly. Outer electrode terminals 320 and 321 of the outermost unit modules 201 and 204 are bent inwardly into an L-shape in cross section in a state in which the outer electrode terminals 320 and 321 protrude slightly more than the other electrode lead connection parts 150.

Although the present invention has been described above with reference to the drawings which illustrate the embodiments of the present invention, it will be apparent to those skilled in the art that various modifications and variations are possible in light of the above teaching without departing from the scope of the invention.

The invention claimed is:

1. A battery assembly comprising at least two battery cells connected in series or in parallel, each of the battery cells comprising an electrode assembly comprising a cathode, an anode and a separator interposed between the cathode and the anode and a battery case in which the electrode assembly is mounted, wherein an electrode terminal of a first one of the battery cells and an electrode terminal of a second one of the battery cells are formed as a single member at a series or parallel connection portion between the first and second battery cells, wherein each of the battery cells is structured such that electrode tabs extending respectively from electrode plates of the electrode assembly are physically coupled to a single electrode lead, and the first battery cell and the second battery cell are structured such that electrode tabs of the first battery cell and electrode tabs of the second battery cell are physically coupled to the same single electrode lead at a series or parallel connection portion between the first and second battery cells.

2. The battery assembly according to claim 1, wherein each of the battery cells is a plate-shaped battery cell.

3. The battery assembly according to claim 2, wherein the plate-shaped battery cell is structured such that a case formed of a laminate sheet comprising a metal layer and a resin layer is sealed around a perimeter of the case by thermal welding after an electrode assembly is mounted in the case.

4. The battery assembly according to claim 1, wherein the electrode assembly is configured in a wound structure, a stacked structure or a stacked/folded structure.

5. The battery assembly according to claim 1, wherein electrode terminals of each of the battery cells comprise a cathode terminal formed of aluminum and an anode terminal formed of a nickel-plated copper.

6. The battery assembly according to claim 1, wherein each of the battery cells is structured such that cathode and anode terminals of the battery cell face opposite ends of the battery case, respectively.

7. A battery module comprising one or more battery assemblies according to claim 1.

8. The battery module according to claim 7, wherein each of the battery assemblies of the battery module comprises two battery cells.

9. The battery module according to claim 8, wherein the battery cells of each of the battery assemblies are arranged in a stacked configuration and electrode terminals of the battery cells are bent at a series or parallel connection portion between the battery cells to achieve the stacked configuration.

10. The battery module according to claim 8, wherein outer surfaces of the battery cells stacked in each of the battery assemblies are covered with a pair of cell covers that are coupled to each other.

11. The battery module according to claim 8, wherein electrical connection between the battery assemblies is achieved by direct coupling between an electrode terminal of a battery cell of a first one of the battery assemblies and an electrode terminal of a battery cell of a second one of the battery assemblies.

12. A device comprising the battery module according to claim 11.

13. The device according to claim 12, wherein the device is an electric vehicle, a hybrid electric vehicle, a plug-in hybrid electric vehicle, or a power storage device.

* * * * *